US008218228B2

(12) United States Patent
Lan et al.

(10) Patent No.: US 8,218,228 B2
(45) Date of Patent: Jul. 10, 2012

(54) TWO-TERMINAL VARIABLE CAPACITANCE MEMS DEVICE

(75) Inventors: Je-Hsiung Lan, Cupertino, CA (US); Evgeni Gousev, Saratoga, CA (US); Ernest Tadashi Ozaki, Poway, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 321 days.

(21) Appl. No.: 12/642,421

(22) Filed: Dec. 18, 2009

(65) Prior Publication Data

US 2011/0149374 A1 Jun. 23, 2011

(51) Int. Cl.
*G02B 26/00* (2006.01)

(52) U.S. Cl. .................. 359/291; 359/223.1; 359/224.1; 359/224.2; 359/290; 359/292; 359/295; 359/298; 359/318; 343/912; 343/915

(58) Field of Classification Search .............. 359/223.1, 359/224.1, 224.2, 290–292, 295, 298, 318; 343/912, 915
See application file for complete search history.

(56) References Cited

U.S. PATENT DOCUMENTS

| 5,463,285 | A | 10/1995 | El-Hamamsy |
| 5,739,802 | A | 4/1998 | Mosier |
| 6,426,687 | B1 | 7/2002 | Osborn |
| 6,441,449 | B1 | 8/2002 | Xu et al. |
| 6,496,351 | B2 | 12/2002 | Hill et al. |
| 6,556,189 | B1 | 4/2003 | Takahata et al. |
| 6,853,041 | B2 | 2/2005 | Khuri-Yakub et al. |
| 6,906,905 | B1 | 6/2005 | Chinthakindi |
| 6,980,412 | B2 | 12/2005 | Cheng et al. |
| 7,075,507 | B2 | 7/2006 | Ozawa |
| 7,141,989 | B1 | 11/2006 | Liu |
| 7,155,182 | B2 | 12/2006 | Eckl et al. |
| 7,265,019 | B2 | 9/2007 | Chinthakindi et al. |
| 7,319,580 | B2 | 1/2008 | Chou |
| 7,361,962 | B2 | 4/2008 | Plowman et al. |
| 7,385,744 | B2 * | 6/2008 | Kogut et al. ............... 359/198.1 |
| 7,439,965 | B2 | 10/2008 | Anderson |
| 7,452,258 | B1 | 11/2008 | Marzen et al. |
| 7,545,622 | B2 | 6/2009 | Morris et al. |
| 7,554,421 | B2 | 6/2009 | Chou |
| 7,586,164 | B2 | 9/2009 | Musalem et al. |
| 7,706,042 | B2 * | 4/2010 | Chung et al. ............... 359/224.1 |
| 8,064,124 | B2 * | 11/2011 | Chung et al. .................. 359/291 |
| 2005/0002082 | A1 | 1/2005 | Miles |
| 2005/0236650 | A1 | 10/2005 | Edwards |
| 2006/0146472 | A1 | 7/2006 | Van Beek et al. |

(Continued)

FOREIGN PATENT DOCUMENTS

EP 1429413 6/2004

(Continued)

OTHER PUBLICATIONS

J. Yao, "RF MEMS from a Device Perspective", *J. Micromech. Microeng.*, 10:R9-R38, 2000.

(Continued)

*Primary Examiner* — Evelyn A. Lester
(74) *Attorney, Agent, or Firm* — Weaver Austin Villeneuve and Sampson LLP

(57) ABSTRACT

A two-terminal, variable capacitance device is described that is constructed by connecting multiple MEMS devices having different actuation or "pull in" voltages in parallel.

16 Claims, 8 Drawing Sheets

U.S. PATENT DOCUMENTS

| | | | |
|---|---|---|---|
| 2007/0013613 A1 | 1/2007 | Umezaki | |
| 2007/0183116 A1 | 8/2007 | Combi et al. | |
| 2008/0315362 A1 | 12/2008 | Lempkowski et al. | |
| 2009/0201008 A1 | 8/2009 | Chou et al. | |
| 2009/0201009 A1 | 8/2009 | Govil | |
| 2009/0201033 A1 | 8/2009 | Govil | |
| 2009/0201034 A1 | 8/2009 | Govil | |
| 2009/0204350 A1 | 8/2009 | Govil et al. | |
| 2009/0224748 A1* | 9/2009 | Mignard et al. | 359/223.1 |
| 2009/0251157 A1 | 10/2009 | Govil | |
| 2010/0039695 A1 | 2/2010 | Govil et al. | |
| 2010/0103641 A1 | 4/2010 | Cho et al. | |
| 2010/0328840 A1 | 12/2010 | Yamazaki | |
| 2011/0017524 A1 | 1/2011 | Chen et al. | |
| 2011/0109383 A1 | 5/2011 | Lan et al. | |
| 2011/0148837 A1 | 6/2011 | Govil | |

FOREIGN PATENT DOCUMENTS

| | | |
|---|---|---|
| EP | 1645902 A2 | 4/2006 |
| EP | 2023329 A1 | 2/2009 |
| EP | 2058276 A2 | 5/2009 |
| JP | 2262120 A | 10/1990 |
| WO | WO0052722 | 9/2000 |
| WO | WO2004055935 | 7/2004 |
| WO | WO2007072404 A2 | 6/2007 |
| WO | WO 2009092605 | 7/2009 |

OTHER PUBLICATIONS

H. Lee et al., "High-Q, Tunable-Gap MEMS Variable Capacitor Actuated with an Electrically Floating Plate", *IEEE*, 180-183, 2008.

International Search Report dated Mar. 15, 2011, PCT Application No. PCT/US2010/059512.

Goldsmith C.L. et al., "RFMems variable capacitors for tunable filters", International Journal of RF and Microwave Computer Aided Engineering, Wiley Interscience, vol. 9, No. 4, Jul. 1, 1999.

Co-pending U.S. Appl. No. 13/279,074, filed on Oct. 21, 2011.

Co-pending U.S. Appl. No. 13/279,089, filed on Oct. 21, 2011.

Co-pending U.S. Appl. No. 13/348,541, filed on Jan. 11, 2012.

International Search Report dated Sep. 29, 2010, PCT Application No. PCT/US2010/036746.

Nonfinal Office Action dated Dec. 5, 2011, U.S. Appl. No. 12/473,882.

* cited by examiner

TWO-TERMINAL VARIABLE CAPACITANCE MEMS DEVICE

BACKGROUND OF THE INVENTION

The present invention relates to variable capacitance devices and, specifically, to variable capacitance devices based on microelectromechanical systems (MEMS) devices.

Conventional MEMS varactors (also known as capacitive switches or switched capacitors) typically have a very small tuning voltage range, i.e., the voltage range over which the device capacitance may be reliably controlled between the minimum and maximum capacitance in an analog manner.

Binary state MEMS devices such as, for example, interferometric modulators (IMODs), are characterized by two stable states with two different capacitances. Thus, such devices can be used as variable capacitance devices, but have had limited utility in that only two stable capacitance values are typically represented, i.e., one corresponding to the relaxed state of the device (i.e., "up state" capacitance), and one corresponding to the actuated state of the device (i.e., "down state" capacitance).

A variety of attempts have been made to come up with devices that have more of a range of capacitance values with varying degrees of success. However, most such devices require undesirable overhead such as, for example, independent device control signals and circuitry, additional switching circuitry, more than two terminals, etc. Widening and/or stabilizing the tuning range of such devices will make them suitable to a much broader range of applications.

SUMMARY OF THE INVENTION

According to the present invention, variable capacitance devices are provided.

According to specific embodiments, a variable capacitance device includes a plurality of MEMS devices connected in parallel. The MEMS devices are characterized by a plurality of different actuation voltages at which corresponding ones of the MEMS devices transition between a relaxed state and an actuated state. The plurality of MEMS devices are configured using specified device variations among the MEMS devices such that the variable capacitance device is characterized by a capacitance versus voltage characteristic that includes a plurality of applied voltage ranges in which corresponding rates of change of capacitance of the variable capacitance device are substantially less than an average rate of change of capacitance represented by the capacitance versus voltage characteristic between minimum and maximum capacitance values for the variable capacitance device.

According to specific embodiments, a variable capacitance device includes a plurality of MEMS devices connected in parallel. Each MEMS device includes first and second electrodes. A first terminal of the variable capacitance device is formed by a first electrical connection among the first electrodes of the MEMS devices. A second terminal of the variable capacitance device is formed by a second electrical connection among the second electrodes of the MEMS devices. The plurality of MEMS devices are configured using specified device variations among the MEMS devices such that the MEMS devices are characterized by a plurality of different tuning voltage ranges over which corresponding ones of the MEMS devices transition between a minimum capacitance and a maximum capacitance.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator (IMOD). As used herein, the term interferometric modulator or interferometric light modulator refers to a device that selectively absorbs and/or reflects light using the principles of optical interference. In certain embodiments, an interferometric modulator may comprise a pair of conductive plates or layers, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. The position of one plate in relation to another can change the optical interference of light incident on the interferometric modulator. In addition, the capacitance of such devices is dependent on the relationship between these plates. Such devices have a wide range of applications, and it would be beneficial in the art to utilize and/or modify the characteristics of these types of devices so that their features can be exploited in improving existing products and creating new products that have not yet been developed.

According to various embodiments of the invention, two-terminal, variable capacitance devices are enabled by connecting multiple MEMS devices having different actuation or "pull in" voltages in parallel. According to a particular class of embodiments, the MEMS devices are interferometric modulators (IMODs). Some background on IMODs that may be employed with such embodiments of the invention will be illustrative. However, it should be noted and will be appreciated by those of skill in the art that variable capacitance devices enabled by the present invention may be constructed from a broader range of MEMS devices including, for example, a wide variety of MEMS varactors.

Figure 1:
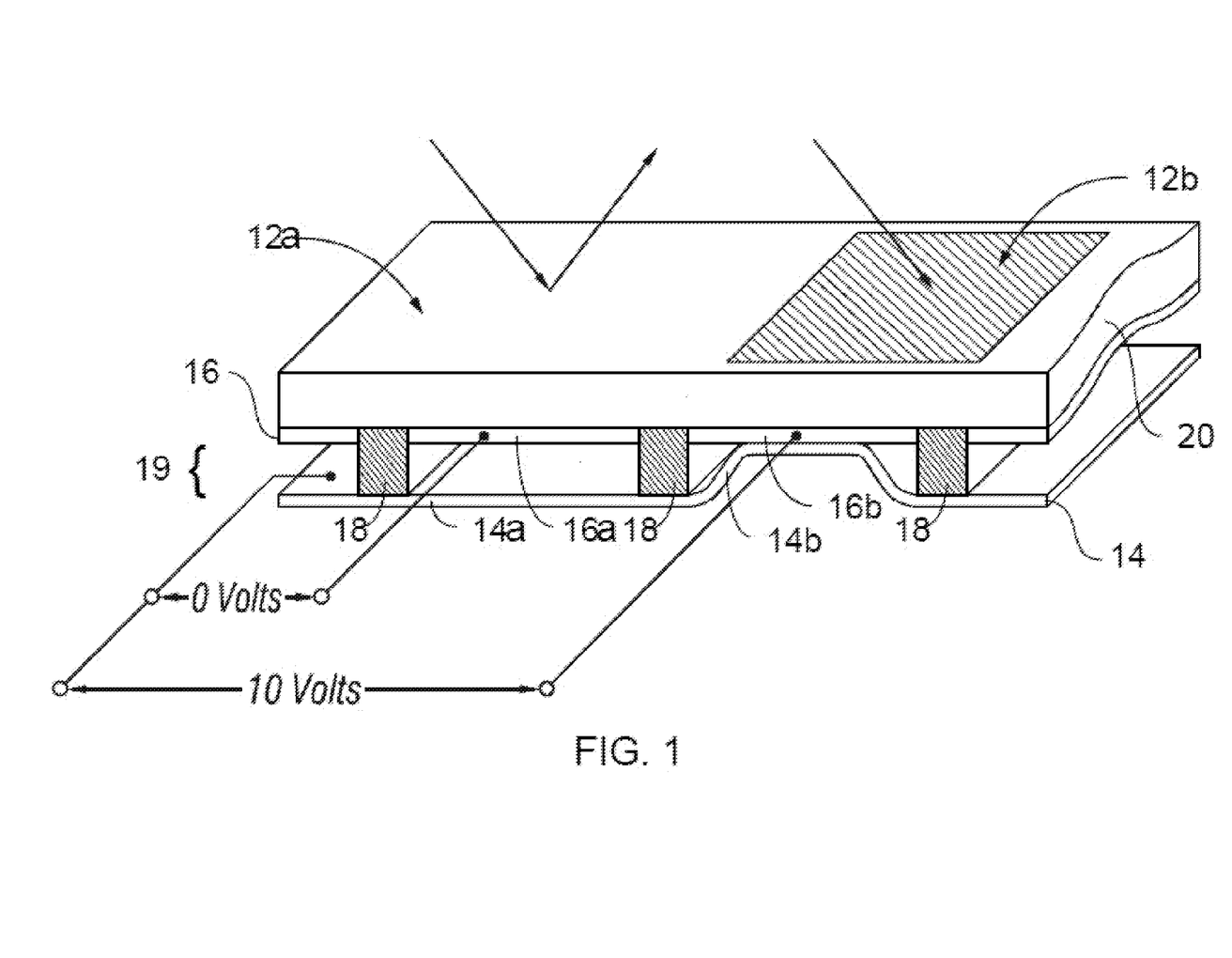
FIG. 1 is an isometric view showing an example of two interferometric modulators in which the movable reflective layer of a first interferometric modulator is in a relaxed position and the movable reflective layer of a second interferometric modulator is in an actuated position.

A pair of interferometric modulators is illustrated in FIG. 1. These devices are in either a reflective or non-reflective state. In the reflective ("relaxed" or "open") state, the device reflects a large portion of incident visible light. When in the non-reflective ("actuated" or "closed") state, the device reflects little incident visible light. Depending on the implementation, the light reflectance properties of the "on" and "off" states may be reversed. Such MEMS devices may also be configured to reflect predominantly at selected colors in addition to black and white. It should be noted that at least some of the optical properties of IMODs or other MEMS devices on which embodiments of the invention are based may not be relevant to the functionality of such embodiments.

FIG. 1 is an isometric view depicting two adjacent MEMS interferometric modulators 12a and 12b. Each interferometric modulator includes a pair of reflective layers positioned at a variable and controllable distance from each other to form a resonant optical gap with at least one variable dimension. One of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each device.

In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b. The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some implementations, the layers of the optical stack 16 may be patterned to form connected electrodes for an array of such devices. The movable reflective layers 14a, 14b may be formed as a deposited metal layer or layers deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and may also form connected electrodes in an array of such devices. Note that FIG. 1 may not be to scale. In some implementations, the spacing between posts 18 may be on the order of approximately 0.5-1.0 um, while the gap 19 may be on the order of approximately 0.2-0.4 um.

With no applied voltage, the gap 19 remains between the movable reflective layer 14a and optical stack 16a, with the movable reflective layer 14a in a mechanically relaxed state, as illustrated by the interferometric modulator 12a in FIG. 1. However, when a potential (voltage) difference is applied across the electrodes of an interferometric modulator, the capacitor formed by the interferometric modulator becomes charged, and electrostatic forces pull the electrodes together. If the voltage is high enough, the movable reflective layer 14 is deformed and is forced against the optical stack 16. A dielectric layer (not illustrated in this figure) within the optical stack 16 may prevent shorting and control the separation distance between layers 14 and 16, as illustrated by actuated interferometric modulator 12b on the right in FIG. 1. The behavior is the same regardless of the polarity of the applied potential difference.

Figure 2:
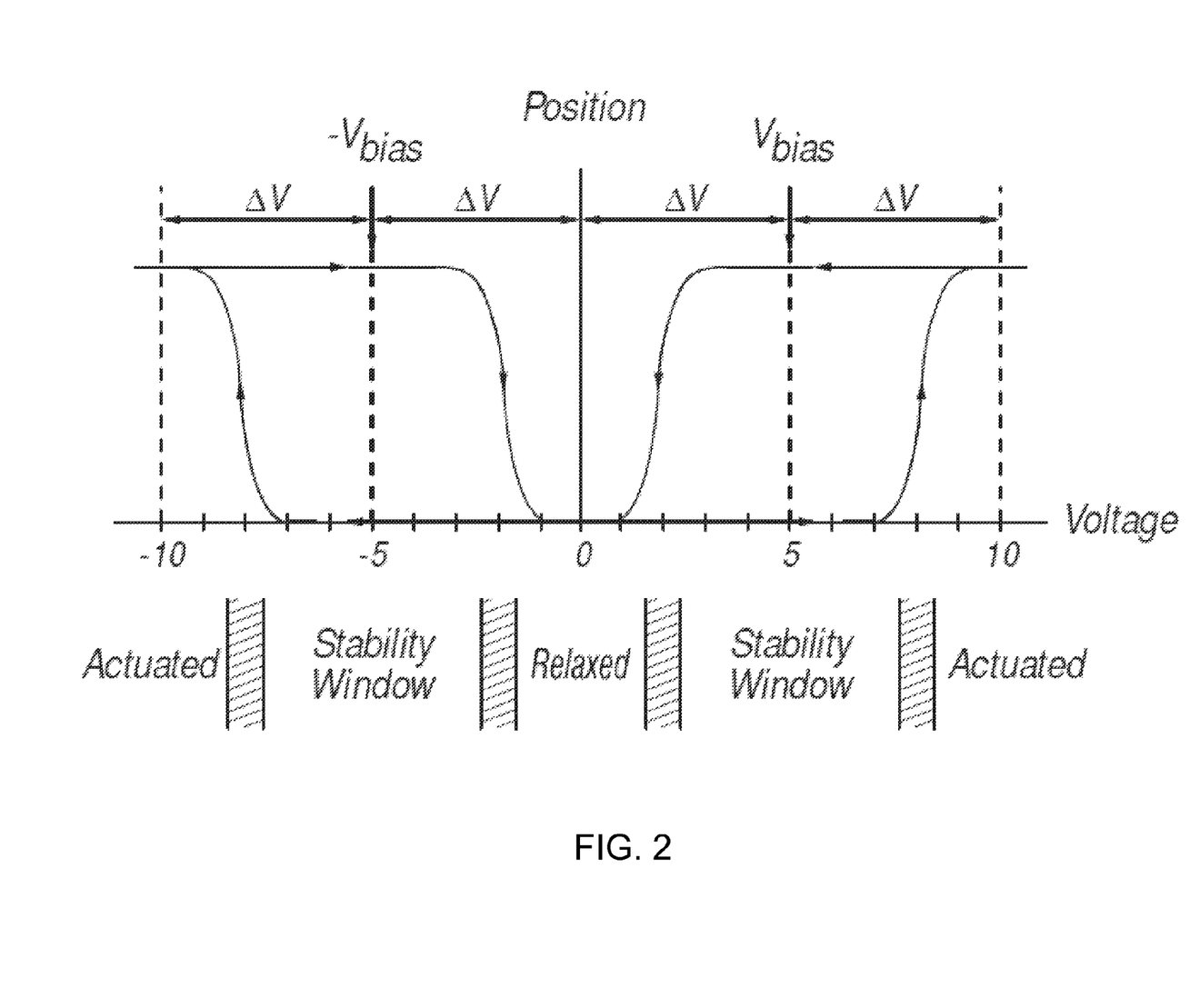
FIG. 2 is a diagram of movable layer position versus applied voltage for one exemplary implementation of an interferometric modulator.

FIG. 2 is a diagram of movable layer position versus applied voltage for one exemplary implementation of an interferometric modulator. For MEMS interferometric modulators, the actuation protocol may take advantage of a hysteresis property of such devices as illustrated in FIG. 2. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary implementation of FIG. 2, the movable layer does not relax completely until the voltage drops below 2 volts. There is thus a range of voltage, about 3 to 7 V in the example illustrated in FIG. 2, where there exists a window of applied voltage within which the device is stable in either the relaxed or actuated state. This is referred to herein as the "hysteresis window" or "stability window." This makes the interferometric modulator design illustrated in FIG. 1 stable under the same applied voltage conditions in either an actuated or relaxed pre-existing state. Since each interferometric modulator, whether in the actuated or relaxed state, is essentially a capacitor formed by the fixed and moving reflective layers, this stable state can be held at a voltage within the hysteresis window with almost no power dissipation. Essentially no current flows into the interferometric modulator if the applied potential is fixed.

Figure 3A:
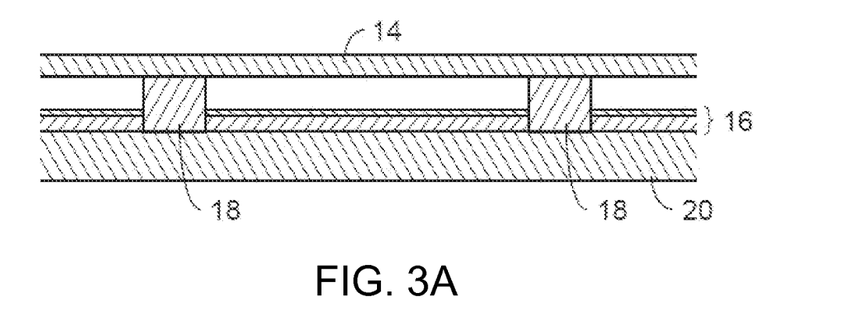
FIGS. 3A-3E are cross sectional views of various alternative implementations of interferometric modulators.
Figure 3B:
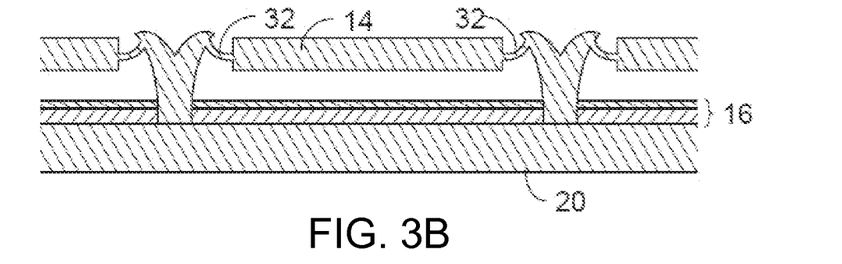
Figure 3C:
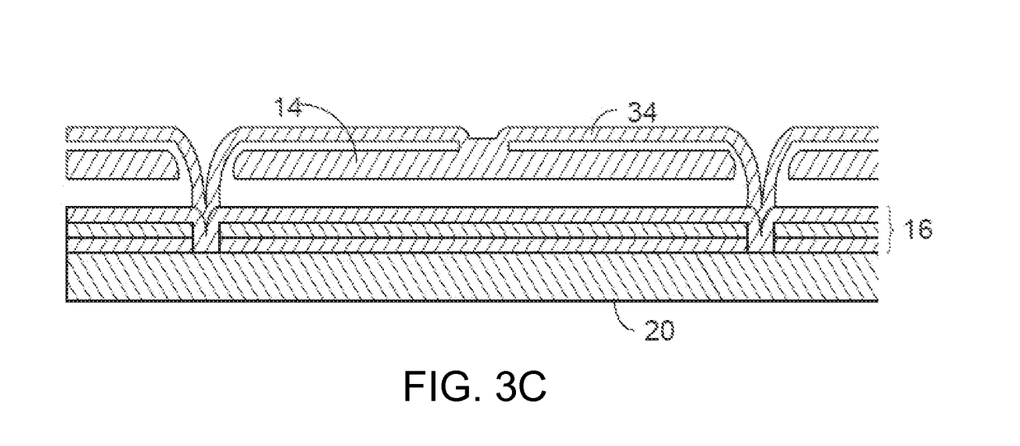
Figure 3D:
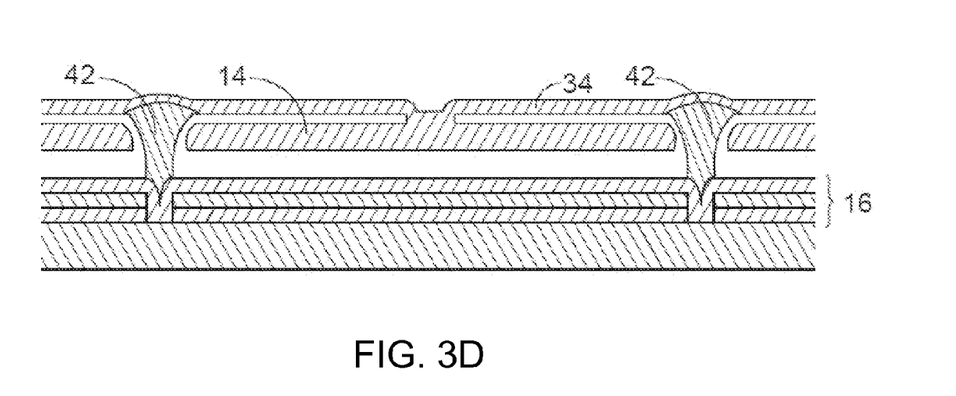
Figure 3E:
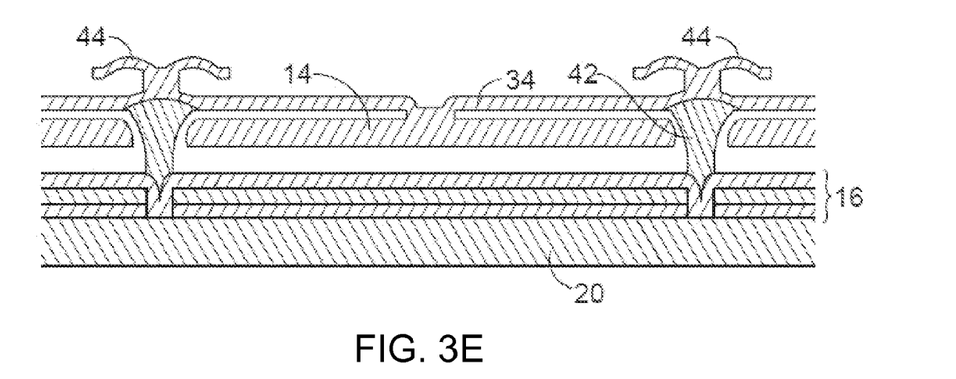

The details of the structure of interferometric modulators that operate in accordance with the principles set forth above may vary widely. For example, FIGS. 3A-3E illustrate five different implementations of the movable reflective layer 14 and its supporting structures. FIG. 3A is a cross section of the IMOD of FIG. 1, where a strip of metal material 14 is deposited on orthogonally extending supports 18. In FIG. 3B, the moveable reflective layer 14 of each interferometric modulator is square or rectangular in shape and attached to supports at the corners only, on tethers 32. In FIG. 3C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The device show in FIG. 3D has support post plugs 42 upon which the deformable layer 34 rests. The movable reflective layer 14 remains suspended over the gap, as in FIGS. 3A-3C, but the deformable layer 34 does not form the support posts by filling holes between the deformable layer 34 and the optical stack 16. Rather, the support posts are formed of a planarization material, which is used to form support post plugs 42. The device illustrated in FIG. 3E is based on the implementation shown in FIG. 3D, but may also be adapted to work with any of the devices illustrated in FIGS. 3A-3C as well as additional implementations not shown. In the device shown in FIG. 3E, an extra layer of metal or other conductive material has been used to form a bus structure 44. This allows signal routing along the back of the interferometric modulators, eliminating a number of electrodes that may otherwise have had to be formed on the substrate 20.

In implementations such as those shown in FIGS. 3A-3E, the reflective layer 14 optically shields the portions of the interferometric modulator on the side of the reflective layer opposite the substrate 20, including the deformable layer 34. Such shielding allows, for example, the bus structure 44 in FIG. 3E, which provides the ability to separate the optical properties of the modulator from the electromechanical properties of the modulator. This separable modulator architecture allows the structural design and materials used for the electromechanical aspects and the optical aspects of the modulator to be selected and to function independently of each other. Moreover, the implementations shown in FIGS. 3C-3E may have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 4:
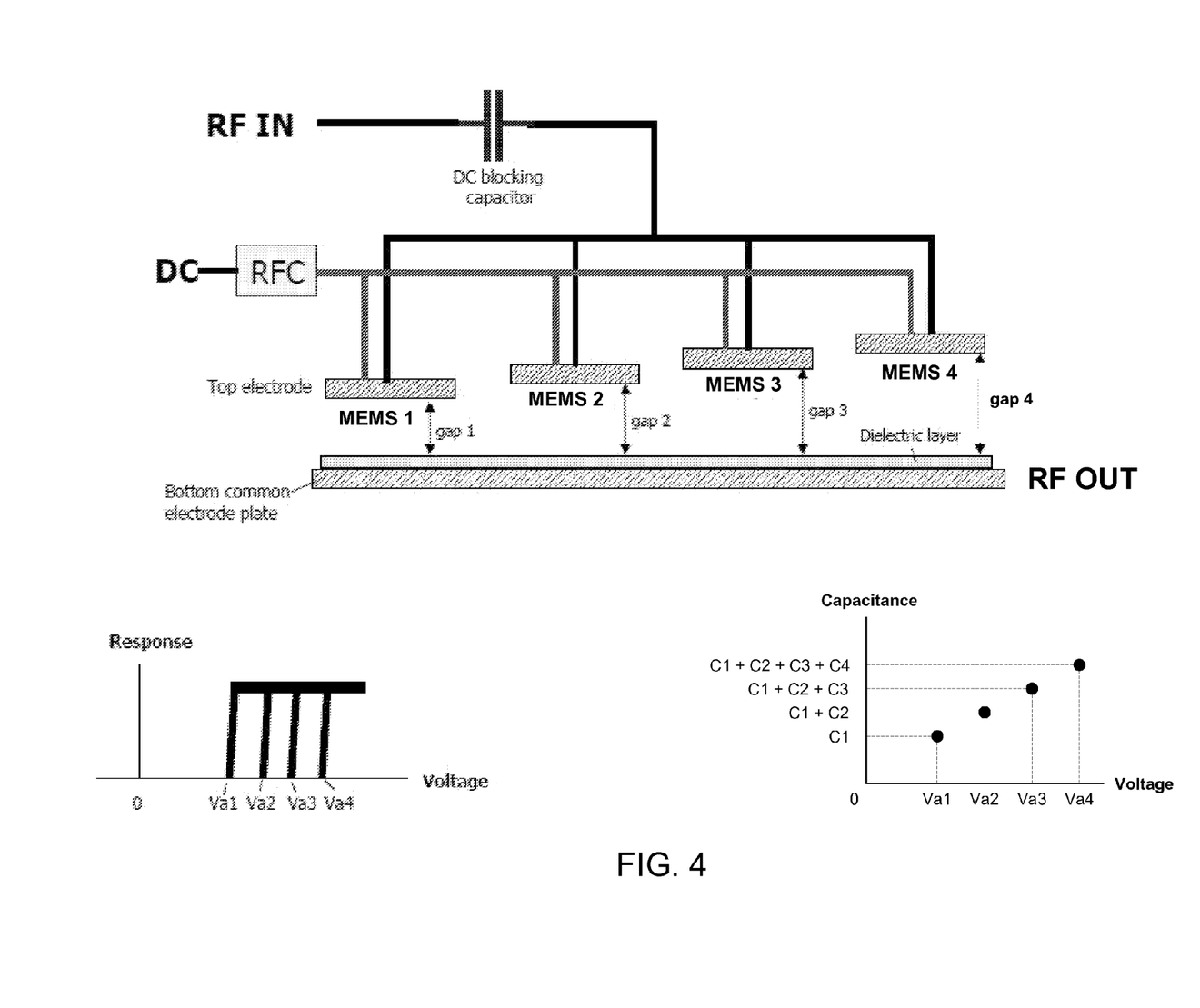
FIG. 4 is a simplified representation of an example of a MEMS device implemented according to a specific embodiment of the invention.

As mentioned above, and notwithstanding the foregoing description of IMODs, embodiments of the invention based on a wide variety of MEMS devices are contemplated. That is, the present invention includes embodiments based on any type of MEMS device that is characterized by a capacitance that may be varied between a minimum and a maximum value with the application of a control voltage. FIG. 4 provides an illustration representing one class of embodiments of the invention. In the example shown, four MEMS devices 1-4 are connected in parallel to form a variable capacitance MEMS device 400 in accordance with a specific embodiment of the invention. MEMS devices 1-4 share a common bottom electrode 406 which corresponds to one terminal of device 400. The second terminal of device 400 is formed by an electrical connection of the top electrodes (401-404) of devices 1-4. This electrical connection may be made in any of a wide variety of ways within the skill of those in the art, and may depend on the type of MEMS device(s) employed. Moreover, it will be understood that the number of devices shown is merely by way of example.

FIG. 4 also includes a plot showing different pull in voltages (Va1, Va2, Va3, and Va4) associated with the four MEMS devices 1-4, and a plot showing the capacitance of device 400 as a function of the applied DC voltage (C1 corresponding to the "down state" capacitance of MEMS device 1, and so on).

As indicated in the figure, MEMS device 400 is a radio frequency (RF) MEMS device. Both the RF signal input and the device DC control voltage are applied to the second terminal of device 400. The apparently separate signal lines in the figure are merely intended to convey isolated RF and DC signal paths. Given that both signals are applied to the same terminal, isolation between the RF and DC domains may be provided using conventional components such as, for example, a DC blocking capacitor 408 between the MEMS device terminal and the RF source (not shown), and/or an RF choke circuit 410 (e.g., an RF coil) between the terminal and the DC source (not shown). As will be understood by those of skill in the art, either or both of these components may be used, as well as any of a variety of other suitable mechanisms or components for providing isolation in such systems.

The example of FIG. 4 graphically illustrates an example of a particular physical characteristic of MEMS devices that may be manipulated to achieve different pull in voltages for the different devices, e.g., different air gap distances between the respective device electrodes. However, it should be understood that this is merely one example of a device characteristic that may be varied in accordance with specific embodiments of the invention to result in different pull in or actuation voltages for the parallel devices. Other device characteristics that may be manipulated include, for example, anchor spacing, stiffness of components of each individual capacitance, etc. Such characteristics may be varied in parallel MEMS devices of the same type, e.g., IMODs, various types of MEMS varactors. However, embodiments are contemplated in which the parallel MEMS devices may be of different types.

Figure 5:
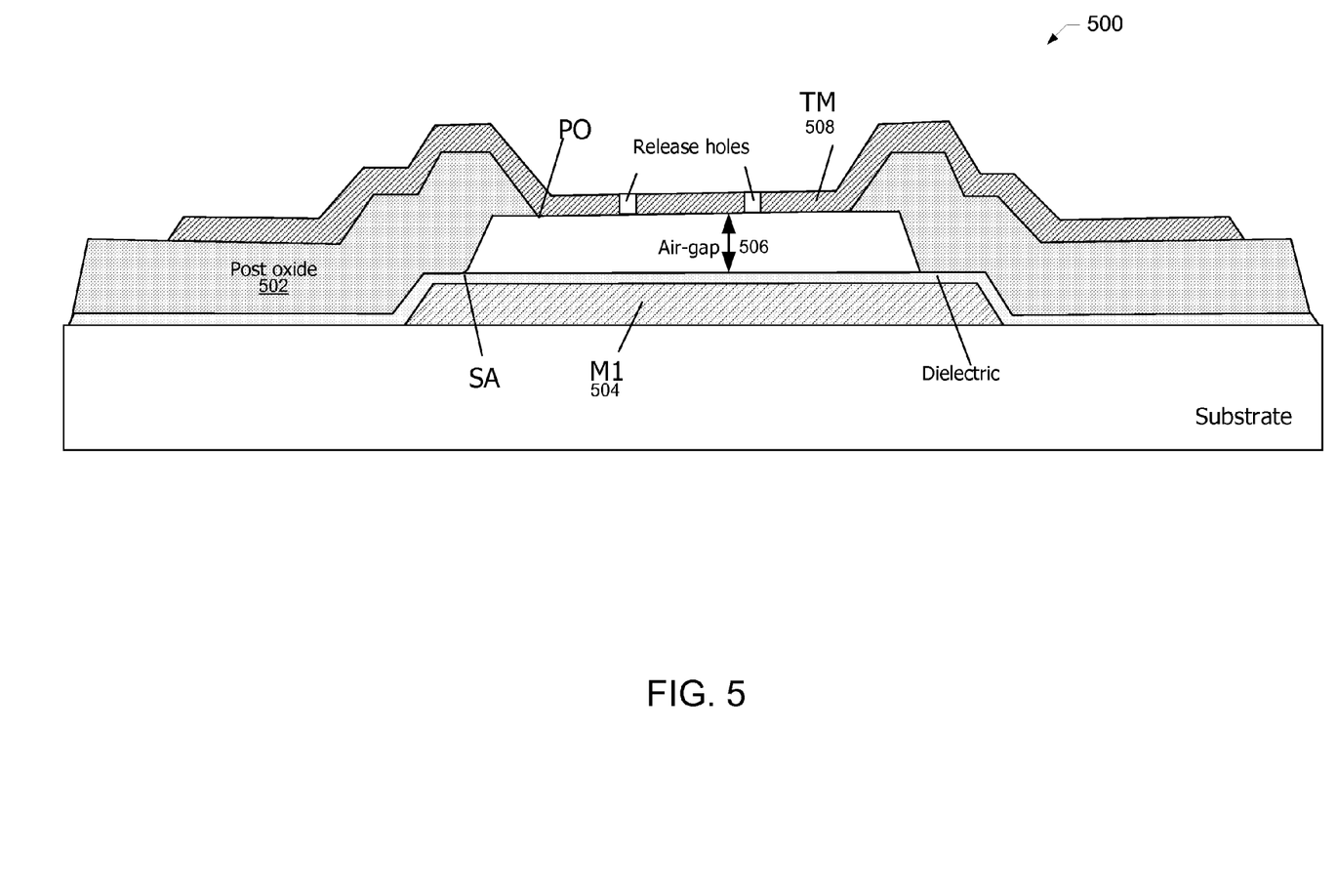
FIG. 5 is another cross sectional view of an alternative implementation of an interferometric modulator.
Figure 6:
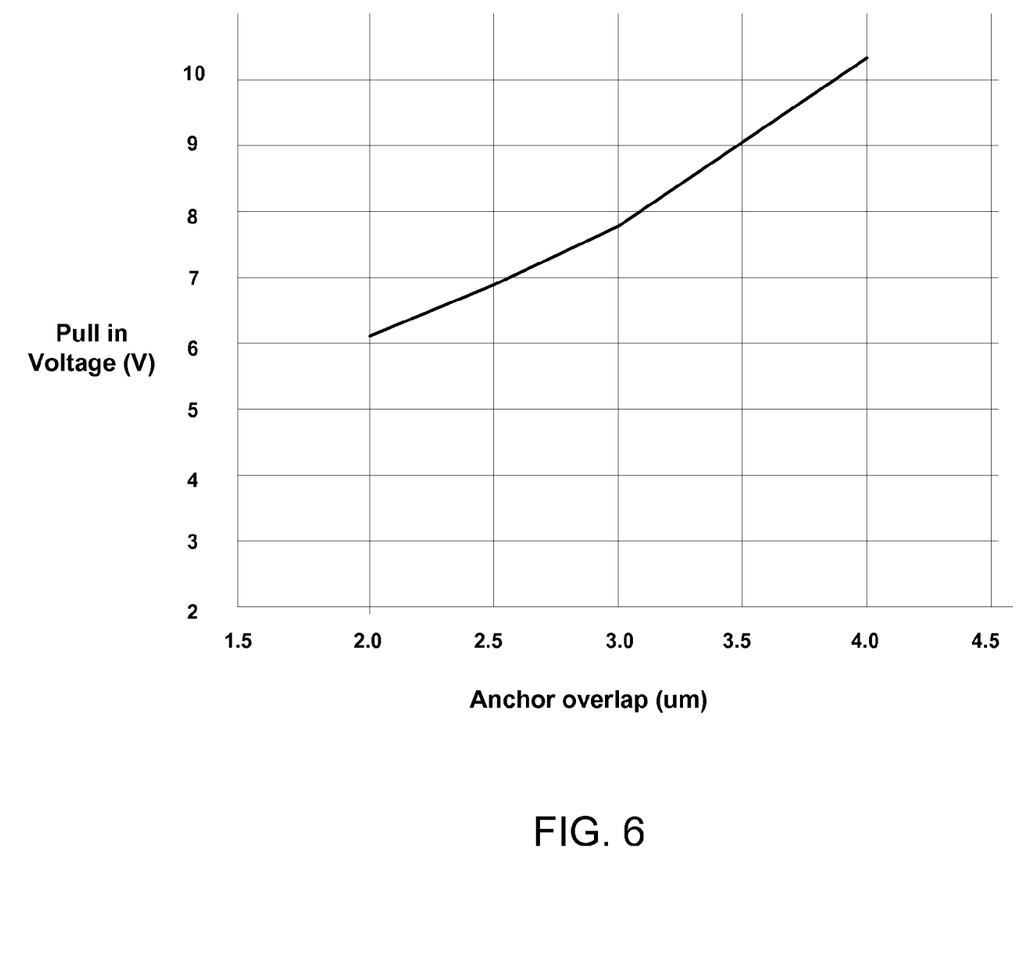
FIG. 6 is a graph illustrating variation of pull in voltage relative to post anchor overlap for a particular interferometric modulator implementation.

FIG. 5 shows another cross-sectional view of a device 500 that may be used with specific embodiments of the invention. Variation of certain physical device characteristics to achieve different pull in voltages may be understood with reference to this figure. According to some embodiments, the device anchors, i.e., post oxides 502, may be manipulated in multiple ways to achieve this effect. For example, the extent to which these anchors overlap the bottom electrode (Metal1 M1 504) may be increased or decreased (relative to the center of the device) which, as will be understood from the figure, would have the effect of increasing or decreasing the air gap 506 between the top electrode (mechanical layer TM 508) and the bottom electrode 504. As will be understood by those of skill in the art, the larger the air gap, the higher the pull in voltage. The graph in FIG. 6 illustrates the effect on pull in or actuation voltage with respect to anchor overlap for a specific implementation.

Increasing or decreasing this overlap may also have the effect of narrowing or widening the width of the top electrode between the post oxide anchors, thus decreasing or increasing the mechanical stiffness of the top electrode, therefore affecting the device pull in voltage. Similarly, changing anchor spacing or using different materials and/or thicknesses for the top electrode can have the desired effect. Another mechanism for controlling the size of the air gap may be through variation of the sacrificial layer. As will be understood, these are merely some examples of the many different device variations which can be introduced to achieve different pull in voltages for MEMS devices for construction of a variable capacitance device in accordance with embodiments of the invention.

According to specific embodiments of the invention, the process architecture for the device of FIG. 5 is similar to that for an IMOD display panel. As discussed above, Metal1 (M1) is used for the capacitor bottom electrode, and mechanical layer TM is used for the capacitor top electrode. To reduce the resistive loss of the MEMS capacitor, thick and low-resistive metals may be used. According to a specific implementation, the bottom electrode (M1) is first sputter-deposited over the substrate (e.g., glass, silicon, GaAs, etc.), and then patterned by photolithography and an etch process (e.g., dry or wet etch). A thin-film dielectric is then deposited (e.g., using CVD, ALD, or PVD) over the bottom electrode as an insulator. This dielectric layer defines the down-state capacitance. Following the thin dielectric layer deposition, a sacrificial layer (not shown) is deposited to form the airgap (after a release process). The thickness of the sacrificial layer determines the airgap height and define the up-state capacitance. After the sacrificial layer is patterned (e.g., using SA), a thick dielectric layer (i.e., post oxide) is deposited over the sacrificial layer as mechanical structural layer (e.g., mechanical beam or membrane). Following the mechanical layer patterning, the sacrificial layer is released by appropriate gas or solution based chemistry to form the MEMS device structure with the airgap or cavity structure as shown.

Figure 7A:
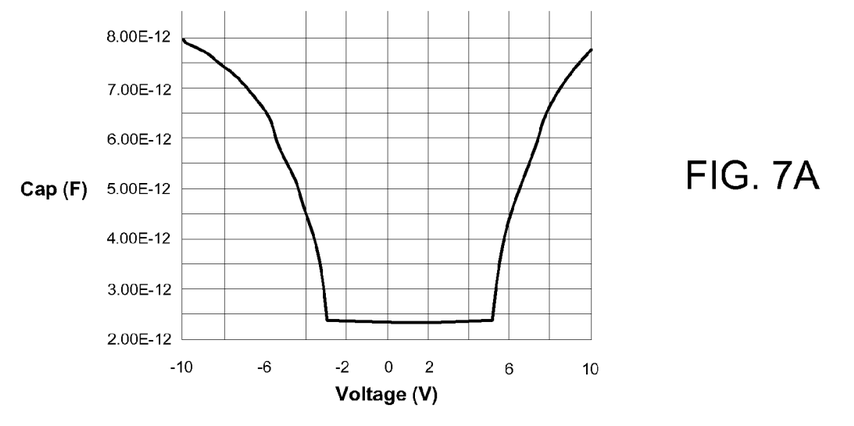
FIGS. 7A-7C are graphs illustrating capacitance versus voltage characteristics for a conventional MEMS varactor in comparison with variable capacitance MEMS devices implemented in accordance with specific embodiments of the invention.
Figure 7B:
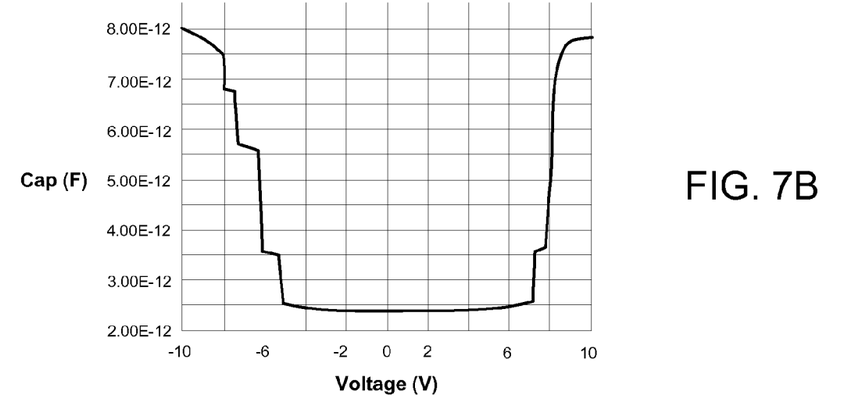
Figure 7C:
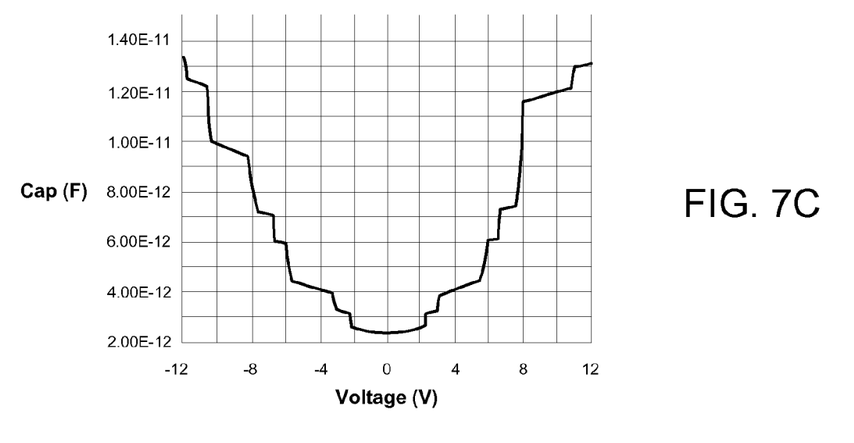

Regardless of the MEMS device type or the device characteristics that are manipulated to achieve the different pull in voltages, the result of this approach may be understood with reference to FIGS. 7A-7C which show a capacitance vs. voltage characteristic for a conventional MEMS device in comparison with those of two MEMS devices constructed in accordance with specific embodiments of the invention. The conventional characteristic of FIG. 7A shows steep and uninterrupted transitions between the minimum and maximum capacitance values. By contrast, the characteristics of the MEMS devices constructed in accordance with embodiments of the invention (FIGS. 7B and 7C) include multiple step-like transitions; the more horizontal portion of each step representing a relatively stable capacitance value; the vertical portion of each step representing actuation or relaxation of one or more of the devices to the next relatively stable capacitance value. As will be understood from the two characteristics, the number and spacing of these step-like transitions may be controlled by varying both the number of MEMS devices connected in parallel and/or the actuation voltages associated with each. That is, the characteristic of FIG. 7C is that of a device having more MEMS devices connected in parallel than that of FIG. 7B.

Variable capacitance MEMS devices implemented in accordance with various embodiments of the invention may be adapted to a wide range of applications for which tunable devices are suitable. Such applications include, for example, RF tunable filters, tunable resonators, tunable antenna, etc.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A variable capacitance device, comprising a plurality of MEMS devices connected in parallel, the MEMS devices being characterized by a plurality of different actuation voltages at which corresponding ones of the MEMS devices transition between a relaxed state and an actuated state, wherein the plurality of MEMS devices are configured using specified device variations among the MEMS devices such that the variable capacitance device is characterized by a capacitance versus voltage characteristic that includes a plurality of applied voltage ranges in which corresponding rates of change of capacitance of the variable capacitance device are substantially less than an average rate of change of capacitance represented by the capacitance versus voltage characteristic between minimum and maximum capacitance values for the variable capacitance device.

2. The variable capacitance device of claim 1 wherein the MEMS devices comprise one or more of interferometric modulators or MEMS varactors.

3. The variable capacitance device of claim 1 wherein the MEMS devices comprise interferometric modulators (IMODs), and wherein the specified device variations comprise one or more of anchor post spacing, anchor post overlap, anchor post height, airgap spacing, movable electrode thickness, or movable electrode material.

4. The variable capacitance device of claim 1 wherein the MEMS devices comprise interferometric modulators (IMODs), each IMOD comprising first and second layers positioned at a variable distance from each other and secured in place using a plurality of anchor posts, and wherein the specified device variations among the IMODs comprise spacing of the anchor posts.

5. The variable capacitance device of claim 1 wherein the MEMS devices comprise interferometric modulators (IMODs), each IMOD comprising first and second layers positioned at a variable distance from each other and secured in place using a plurality of anchor posts, and wherein the specified device variations among the IMODs comprise overlap of the anchor posts relative to an electrode associated with each IMOD.

6. The variable capacitance device of claim 1 wherein the MEMS devices comprise interferometric modulators (IMODs), each IMOD comprising first and second layers positioned at a variable distance from each other and secured in place using a plurality of anchor posts, and wherein the specified device variations among the IMODs comprise both spacing of the anchor posts and overlap of the anchor posts relative to an electrode associated with each IMOD.

7. The variable capacitance device of claim 1 wherein the variable capacitance device is configured as one of a tunable filter, a tunable resonator, or a tunable antenna.

8. The variable capacitance device of claim 1 wherein the MEMS devices are configured for radio frequency (RF) operation, and wherein a first terminal of the variable capacitance device is configured to receive both an RF signal from an RF source and a DC signal from a DC source, the variable capacitance device further comprising one or more isolation components for providing isolation for one or both of the RF source or the DC source.

9. A variable capacitance device, comprising a plurality of MEMS devices connected in parallel, each MEMS device comprising first and second electrodes, a first terminal of the variable capacitance device being formed by a first electrical connection among the first electrodes of the MEMS devices, a second terminal of the variable capacitance device being formed by a second electrical connection among the second electrodes of the MEMS devices, wherein the plurality of MEMS devices are configured using specified device variations among the MEMS devices such that the MEMS devices are characterized by a plurality of different tuning voltage ranges over which corresponding ones of the MEMS devices transition between a minimum capacitance and a maximum capacitance.

10. The variable capacitance device of claim 9 wherein the MEMS devices comprise one or more of interferometric modulators or MEMS varactors.

11. The variable capacitance device of claim 9 wherein the MEMS devices comprise interferometric modulators (IMODs), and wherein the specified device variations comprise one or more of anchor post spacing, anchor post overlap, anchor post height, airgap spacing, movable electrode thickness, or movable electrode material.

12. The variable capacitance device of claim 9 wherein the MEMS devices comprise interferometric modulators (IMODs), each IMOD comprising first and second layers positioned at a variable distance from each other and secured in place using a plurality of anchor posts, and wherein the specified device variations among the IMODs comprise spacing of the anchor posts.

13. The variable capacitance device of claim 9 wherein the MEMS devices comprise interferometric modulators (IMODs), each IMOD comprising first and second layers positioned at a variable distance from each other and secured in place using a plurality of anchor posts, and wherein the specified device variations among the IMODs comprise overlap of the anchor posts relative to one of the electrodes of each IMOD.

14. The variable capacitance device of claim 9 wherein the MEMS devices comprise interferometric modulators (IMODs), each IMOD comprising first and second layers positioned at a variable distance from each other and secured in place using a plurality of anchor posts, and wherein the specified device variations among the IMODs comprise both spacing of the anchor posts and overlap of the anchor posts relative to one of the electrodes of each IMOD.

15. The variable capacitance device of claim 9 wherein the variable capacitance device is configured as one of a tunable filter, a tunable resonator, or a tunable antenna.

16. The variable capacitance device of claim 9 wherein the MEMS devices are configured for radio frequency (RF) operation, and wherein a first terminal of the variable capacitance device is configured to receive both an RF signal from an RF source and a DC signal from a DC source, the variable capacitance device further comprising one or more isolation components for providing isolation for one or both of the RF source or the DC source.

* * * * *